United States Patent Office 3,781,227
Patented Dec. 25, 1973

3,781,227
CATALYST FOR HYDROGENATION OF NITRO-COMPOUNDS AND A METHOD OF PRODUCING SAME
Dmitry Vladimirovich Sokolsky, prospekt Abaya 31, kv. 38; Gaukhar Daulenovna Zakumbaeva, prospekt Abaya 31, kv. 36; Kair Akhmetovich Zhubanov, prospekt Abaya 34, kv. 21; Evgeny Petrovich Mazin, ulitsa Spartaka 14, kv. 4; and Nikolai Illarionovich Scheglov, ulitsa Aue Zova 136, kv. 22, all of Alma-Ata, U.S.S.R.; and Evgeny Pavlovich Fokin, ulitsa Pravdy 1, kv. 14; and Vladimir Arkadievich Livanov, Novosibirsk, ulitsa Zoloto-Dolinskaya 9, kv. 28, both of Novosibirsk, U.S.S.R.
No Drawing. Filed Jan. 15, 1971, Ser. No. 106,932
Int. Cl. B01j 11/22
U.S. Cl. 252—466 J          6 Claims

ABSTRACT OF THE DISCLOSURE

A catalyst for the hydrogenation of nitro-compounds which is comprised of a nickel-aluminum alloy promoted with a metal or mixtures of metals of Group VIII and containing an addition of a metal of the Group II.
A method of producing said catalyst comprising alloying nickel and aluminum with a metal or mixtures of metals of Group VIII and a metal of Group II with the subsequent leaching of 3-5 wt. percent of aluminum from the alloy obtained.
The present catalyst exhibits high stability, is capable of a prolonged and continuous service life, providing an 80-100% yield of the desired products.

This invention relates to catalysts for hydrogenation of nitro-compounds and methods of producing same. The present invention is of great practical interest as the hydrogenation products synthesized with the use of the aforementioned catalysts are monomers employed for the production of thermally stable polymers, dyes and intermediates for the synthesis of physiologically active compounds.

A catalyst is known for the hydrogenation of nitro-derivatives of diphenyl ether comprising Raney nickel. This known catalyst is prepared by alloying 50 wt. percent of nickel and 50 wt. percent of aluminum followed by complete leaching of the aluminum from the alloy.

A catalyst is also known for the hydrogenation of nitrobenzene based on nickel promoted with palladium. This known catalyst is prepared by alloying 49.5 wt. percent of nickel and 50 wt. percent of aluminum and 0.5 wt. percent of palladium with the subsequent complete leaching of the aluminum from the alloy.

These known catalysts suffer from the following disadvantages.

(1) The catalysts can be used only in the form of suspensions owing to their low stability.

(2) The catalysts can be used only in an apparatus which is imperfect from an engineering standpoint, in that it is difficult to control and suitable for batch processes only and in which much time is spent not on the hydrogenation as such but for pumping in the starting product, pumping out the final product and preparing the catalyst (its complete leaching and reduction for regeneration).

(3) Large quantities of the catalyst are consumed (5-50% of the weight of the starting product) which results in the final product cost increase.

(4) The necessity of a filtration step to separate the final product from the catalyst.

(5) A rather low yield of the hydrogenation products (65% of theory).

It is an object of the present invention to provide a highly stable catalyst for the hydrogenation of nitro-compounds.

Another object of the present invention is to provide a catalyst for hydrogenation of nitro-compounds capable of operating continuously over a prolonged period of time and ensuring an 80-100% yield of the desired products.

A further object of the invention is to provide a method of producing a catalyst for the hydrogenation of nitro-compounds exhibiting the afore-mentioned properties.

In accordance with the above-mentioned and other objects the present invention consists in using a catalyst based on nickel promoted with palladium, said catalyst being a nickel-aluminum alloy which may contain as promoting additions, along with palladium any other metal of Group VIII or a mixture of metals of Group VIII, as well as an addition of a metal of Group II.

It is advisable to use a catalyst consisting of 32-56 wt. percent of nickel, 40-62 wt. percent of aluminum, 0.011-0.11 wt. percent of metals of Group VIII and 1.1-5.5 wt. percent of a metal of Group II.

The present hydrogenation catalyst possesses high stability due to the addition of a metal of Group II and is capable of operating continuously for a prolonged period of time and giving a 80-100% yield of the desired products.

The present catalyst can be prepared by a method based on alloying nickel, aluminum and palladium with the subsequent leaching of the aluminum. According to the invention, nickel and aluminum can be melted together not only with palladium but with any other metal of Group VIII or with a mixture of metals of Group VIII and also a metal of Group II and 3-5 wt. percent of aluminum is then leached from the alloy obtained.

For the preparation of the alloy it is preferable to take 30-50 wt. percent of nickel, 45-65 wt. percent of aluminum, 0.01-0.1 wt. percent of metals of Group VIII and 1-5 wt. percent of a metal of Group II.

The metals are alloyed in the following way. In a stove aluminum is melted and then nickel and a metal or a mixture of metals of Group VIII are added to the melt. As a result of an exothermic reaction between aluminum and nickel the temperature of the melt rises markedly. A metal of Group II is then added to the melt in an atmosphere of inert gas (nitrogen or argon) or in air first bringing the melt temperature level up to or lower than the boiling temperature of the metal of Group II. The obtained melt is distributed into molds and granulated into particles of 3-10 mm. in dia., wherefrom aluminum is leached in an amount of 3-5 wt. percent. On losing activity, the catalyst can be regenerated 10-15 times by leaching aluminum by 3-5 wt. percent (each time). The duration of an interregeneration period ranges from 500 to 700 hours.

It should be noted that the nickel consumption involved in leaching does not exceed 0.5 g. per 1 kg. of the hydrogenation product, which consumption is 10-15 times less than that involved in the use of the known suspended catalysts.

The granular form of the present catalyst makes it possible to use it in a continuous hydrogenation process, the catalyst consumption being so small that the hydrogenation can be carried out without filtering the final product.

For a better understanding of the present invention by those skilled in the art, the following examples of preparing a catalyst for the hydrogenation of nitro-compounds are given by way of illustration.

EXAMPLE 1

1 kg. of aluminum was melted at 660° C. 900 g. of nickel and 2 g. of metallic palladium were added to the melt obtained, whereby the melt temperature rose up to 1600° C. The melt temperature was then brought to 800° C. and 98 g. of metallic zinc were added. The melt was then distributed into molds and granulated to obtain particles of 9 mm. in dia. The granules obtained had the following composition (wt. percent): nickel—45, aluminum—50, palladium—0.1, zinc—4.9. 5 wt. percent of aluminum were leached from the granules by treating them with a 20% aqueous solution of sodium hydroxide.

The catalyst thus produced was tested in the hydrogenation of 4,4'-dinitrodiphenyl ether (hydrogenation temperature 100° C., hydrogen pressure 25 atm., feed rate of a 15% solution of the starting ether in dimethyl formamide 0.18 hr.$^{-1}$). 4,4'-diaminodiphenyl ether was thus produced in a yield of 100% of theory. The catalyst was operating for 700 hours without regeneration providing the aforementioned yield, its consumption being 0.4–0.5 g. per 1 kg. of the hydrogenation product.

EXAMPLE 2

1 kg. of aluminum was melted at 660° C. 900 g. of nickel and 2 g. of metallic palladium were added to the melt obtained whereby the melt temperature rose up to 1600° C. The melt temperature was then brought to 1000° C. and 99.8 g. of magnesium were added in an atmosphere of inert gas (nitrogen or argon). The melt was then distributed into molds and granulated to obtain particles of 7 mm. in dia. The granules obtained had the following composition: (wt. percent) nickel—45, aluminum—50, magnesium—4.99, palladium—0.01. 4 wt. percent of aluminum were leached from the granules by treating them with a 20% aqueous solution of sodium hydroxide.

The catalyst thus produced was tested in the hydrogenation of 3,3'-dinitro-4,4'-diaminodiphenyl ether (hydrogenation temperature 100° C., hydrogen pressure 25 atm., feed rate of a 10% solution of the starting ether in dimethyl formamide 0.12 hr.$^{-1}$) 3,3', 4,4'-tetraaminodiphenyl ether was thus produced in a yield of 100% of theory. The catalyst was operating for 300 hours without regeneration providing the aforementioned yield, its consumption being 0.4–0.5 g. per 1 kg. of the hydrogenation product.

EXAMPLE 3

1 kg. of aluminum was melted at 660° C. 936 g. of nickel, 2 g. of palladium and 2 g. of platinum were added to the melt obtained whereby the melt temperature rose up to 1600° C. The melt temperature was then brought to 800° C. and 60 g. of metallic cadmium were added. The melt was distributed into molds and granulated to obtain particles of 9 mm. in dia. The granules obtained had the following composition (wt. percent): nickel—46.8, aluminum—50, palladium—0.1, platinum—0.1, cadmium—3. 3 wt. percent of aluminum were leached from the granules by treating them with a 20% aqueous solution of sodium hydroxide.

The catalyst thus produced was tested in the hydrogenation of bis-4-(nitrophenyloxide)-hydroquinone (hydrogenation temperature 100° C., hydrogen pressure 130 atm., feed rate of a 10% solution of the starting nitrocompound in dimethyl formamide 0.2 hr.$^{-1}$). The hydrogenation product was thus produced in a yield of 100% of theory. The catalyst was operating for 500 hours without regeneration providing the aforementioned yield, its consumption being 0.4–0.5 g. per 1 kg. of the hydrogenation product.

EXAMPLE 4

1 kg. of aluminum was melted at 660° C. 930 g. of nickel and 10 g. of platinum were added to the melt obtained whereby the melt temperature rose up to 1600° C. The melt temperature was then brought to 1000° C. and in a stream of an inert gas (nitrogen), 60 g. of calcium were added. The melt was distributed into molds and granulated to obtain particles of 9 mm. in dia. The granules obtained had the following composition (wt. percent): nickel—46.5, aluminum—50, platinum—0.5, calcium—3. 5 wt. percent of aluminum were leached from the granules by treating them with a 20% aqueous solution of sodium hydroxide.

The catalyst thus produced was tested in the hydrogenation of bis-3-(nitro-4-aminophenyloxide)-hydroquinone. The hydrogenation conditions were similar to those described in Example 3. The hydrogenation product was produced in a yield of 80% of theory. The catalyst was operating for 500 hours without regeneration providing the aforementioned yield, its consumption being 0.4–0.5 g. per 1 kg. of the hydrogenation product.

EXAMPLE 5

1 kg. of aluminum was melted at 660° C. 890 g. of nickel and 10 g. of rhodium were added to the melt obtained whereby the melt temperature rose up to 1600° C. The melt temperature was then brought to 800° C. and 100 g. of zinc were added. The melt was distributed into molds and granulated to obtain particles of 9 mm. in dia. The granules obtained had the following composition (wt. percent: nickel—44.5, aluminum—50, zinc—5, rhodium—0.5. 3 wt. percent of aluminum were leached from the granules by treating them with a 20% aqueous solution of sodium hydroxide.

The catalyst thus produced was tested in the hydrogenation of 4,4'-dinitrodiphenyl ether. The hydrogenation conditions were similar to those described in Example 3. 4,4'-diaminodiphenyl ether was produced in a yield of 100% of theory. The catalyst was operating for 700 hours without regeneration providing the aforementioned yield, its consumption being 0.4–0.5 g. per 1 kg. of the hydrogenation product.

EXAMPLE 6

1 kg. of aluminum was melted at 660° C. in an atmosphere of nitrogen. 900 g. of nickel and 2 g. of palladium were then added to the melt obtained whereby the temperature rose up to 1600° C. The melt temperature was then brought to 800° C. and 48 g. of metallic zinc were added. The melt was distributed into molds and granulated to obtain particles of 5 mm. in dia. The granules obtained had the following composition (wt. percent): nickel—46.2, aluminum—51.2, palladium—0.1, zinc—2.5. 5 wt. percent of aluminum were leached from the granules by treating them with a 20% aqueous solution of sodium hydroxide.

The catalyst thus produced was tested in the hydrogenation of p-nitrophenol (hydrogenation temperature 100° C., pressure 150 atm., feed rate of a 30% aqueous solution of p-nitrophenol 0.2 hr.$^{-1}$). This resulted in producing p-aminophenol in a yield of 100% of theory. The catalyst was operating for 500 hours without regeneration providing the aforementioned yield, its consumption being 0.8–1 g. per 1 kg. of the hydrogenation product.

EXAMPLE 7

A catalyst prepared as described in Example 6 was tested in the hydrogenation of p-nitrophenetole (hydrogenation temperature 200° C., pressure 150 atm., feed rate of a liquid p-nitrophenetole 0.35 hr.$^{-1}$). This resulted in producing p-phenetidine in a yield of 100% of theory. The catalyst operated for 700 hours without regeneration providing the aforementioned yield, its consumption being 0.8–1 g. per 1 kg. of the hydrogenation product.

EXAMPLE 8

1 kg. of aluminum was melted at 660° C. in an atmosphere of nitrogen. 700 g. of nickel and 1.2 g. of metallic palladium were then added to the melt obtained whereby the melt temperature rose to 1600° C. The melt temperature was then brought to 800° C. and 100 g. of metallic cadmium were added. The melt was distributed into molds and granulated to obtain particles of 5 mm. in dia. The granules obtained had the following composition (wt. percent): aluminum—55.6, nickel—38.8, palladium—0.07, cadmium—5.53. 5 wt. percent of aluminum were leached from the granules by treating them with a 10% aqueous solution of sodium hydroxide.

The catalyst thus prepared was tested in the hydrogenation of p-nitrophenol (hydrogenation temperature 100° C., pressure 150 atm., feed rate of a 30% aqueous solution of p-nitrophenol 0.2 hr.$^{-1}$). This resulted in producing of p-aminophenol in a yield of 100% of theory. The catalyst was operating for 500 hours without regeneration providing the aforementioned yield, its consumption being 0.8–1 g. per 1 kg. of the product.

EXAMPLE 9

A catalyst, prepared as described in Example 8, was tested in the hydrogenation of p-nitrophenetole (hydrogenation temperature 200° C., pressure 150 atm., feed rate of a liquid p-nitrophenetole 0.4 hr.$^{-1}$). This resulted in producing p-phenetidine in a yield of 100% of theory. The catalyst was operating for 700 hours without regeneration, its consumption being 0.8–1 kg. per 1 kg. of the hydrogenation product.

What is claimed is:

1. A catalyst for the hydrogenation of nitro-compounds consisting essentially of a partially leached nickel-aluminum alloy containing 32–56 wt. percent of nickel and 40–62 wt. percent of aluminum and promoting amounts of at least one metal of Group VIII other than nickel and of a metal of Group II in which said amount of aluminum is the amount remaining after partial leaching of 3–5 wt. percent of aluminum.

2. A catalyst as claimed in claim 1, which contains 0.011–0.11 wt. percent of metals of Group VIII and 1.1–5.5 wt. percent of a metal of Group II.

3. A method of preparing a catalyst for the hydrogenation of nitro-compounds comprising preparing an alloy of nickel and aluminum containing 30–50 wt. percent of nickel and 45–65 wt. percent of aluminum and promoting amounts of at least one metal of Group VIII other than nickel and of a metal of Group II and leaching 3–5 wt. percent of aluminum from the alloy obtained.

4. A method as claimed in claim 3, in which 0.01–0.1 wt. percent of metals of Group VIII and 1–5 wt. percent of a metal of Group II are taken to prepare the alloy.

5. A catalyst as claimed in claim 2 wherein said metal of Group VIII other than nickel is selected from the group consisting of platinum, palladium and rhodium and said metal of Group II is selected from the group consisting of zinc, magnesium, cadmium and calcium.

6. A method as claimed in claim 4 wherein the leaching step comprises treating the alloy with a 10–20% aqueous solution of sodium hydroxide.

References Cited

UNITED STATES PATENTS

| | | | |
|---|---|---|---|
| 3,341,936 | 9/1967 | Sanstede | 29—529 |
| 2,673,189 | 3/1954 | Reynolds | 252—466 |
| 2,829,116 | 4/1958 | Alexander | 252—473 |
| 2,326,275 | 8/1943 | Zeitner | 252—259 |
| 2,384,501 | 9/1945 | Streicher | 252—477 QX |

FOREIGN PATENTS

J.A.C.S., vol. 61, pp. 384–87, 1939, article of Reasenberg et al.

J.A.C.S., vol. 71, p. 1515, 1949, letter of Levering et al.

DANIEL E. WYMAN, Primary Examiner

W. J. SHINE, Assistant Examiner

U.S. Cl. X.R.

252—466 PT, 466 B, 477 Q